United States Patent [19]

Weninger

[11] 4,090,785
[45] May 23, 1978

[54] LOW NOISE BLOWER CLUTCH
[75] Inventor: Frank L. Weninger, Chicago, Ill.
[73] Assignee: Bell & Howell Company, Chicago, Ill.
[21] Appl. No.: 682,240
[22] Filed: May 3, 1976

Related U.S. Application Data
[63] Continuation-in-part of Ser. No. 573,208, Apr. 30, 1975, abandoned.
[51] Int. Cl.² ............... G03B 21/18; F16D 7/02; F16D 23/00
[52] U.S. Cl. ............... 353/57; 64/30 E; 192/56 C
[58] Field of Search ............ 353/57–61; 192/56 C; 64/30 E; 416/169 A, 169 R, 170 R, 214

[56] References Cited
U.S. PATENT DOCUMENTS

| 2,626,029 | 1/1953 | Gutterman | 192/56 C |
| 3,075,691 | 1/1963 | Kelley | 416/169 A |
| 3,280,699 | 10/1966 | Badalich | 353/57 |

Primary Examiner—Steven L. Stephan
Attorney, Agent, or Firm—John E. Peele, Jr.; Stanley J. Tomsa; James V. Lapacek

[57] ABSTRACT

Disclosed is a blower assembly for use in dispersing heat from an image projector with minimum air flow noise by interposing a constant torque clutch formed of a dual wound spring between the blower and a motor output drive to permit the rate of rotation of the blower to vary in response to variations in air weight due to changes in temperature, atmospheric pressure, and moisture content.

4 Claims, 3 Drawing Figures

LOW NOISE BLOWER CLUTCH

This application is a continuation-in-part application of application Ser. No. 573,208 filed on Apr. 30, 1975, now abandoned.

The present invention relates to an improvement in operation of a blower particularly for use in photographic image projection equipment, such as a slide or cine projector, to obtain adequate air flow with low blower noise.

Due to the heat generated by projection lamps of image projection equipment, several efforts have been made to efficiently cool the aperture of a projector through which damageable film must pass, and to otherwise disperse the heat. Certain of these cooling systems are efficient in moving air but generate significant air flow noise. In other such systems, the air flow noise is reduced but the air flow efficiency is likewise reduced. Often, the compromise for best air flow efficiency and best air flow noise is approached only at an ideal ambient temperature of the room in which the apparatus is used. Alternatively, the compromise is reached only by use of an oversize blower operated inefficiently over most of the temperature range, and reaching high efficiency only at exceptional conditions. As the temperature increases or decreases due to changes in the ambient temperature, the weight of the air and therefore the resistance against the blower changes sufficiently to cause one or the other of these desireable factors to be reduced. Hence, many designers, in the interest of protecting the film, have ignored the question of noise in deference to the problem of adequate cooling. Further, the blower may be run at a fixed speed adequate for high altitude and high temperature, but inadequate for other conditions, since a prohibitively large motor would be required. Because the motor for driving the blower is operated within a certain predetermined range, the blower is optimized for that range of speed at some standard temperature. Usually, the blower is fixed to the drive shaft of the motor and rotates therewith. Hence, the rate of blower rotation is varied in substantially direct response to the load on the motor rather than in response to variations in air temperature. Therefore, the blower is usually operated at a relatively high noise level, which is caused by driving the blower at a rate to continuously move a constant volume of air.

Although variations in the motors and other components of the mass produced projection equipment are within a predetermined range, that range is broad enough so that noise is often generated by even the most accurately matched blower and motor combination.

Blower speed variations resulting in loss of cooling efficiency are caused by several factors over which the manufacturer of the apparatus and the user have no control. The primary variations are caused by changes in air weight and density and therefore changes in resistance due to changes in altitude and temperature and moisture content of ambient air. The heat exchange process in an apparatus such as a projector is subject to changes in temperature of the air moved through the apparatus by a blower mounted therein. To ensure adequate cooling for all conditions in which the apparatus is likely to be used, an oversize blower and motor with high power and high slip motors have been used by manufacturers of such apparatus. Specifically, a significant change in air temperature occurs between the time when a projection lamp is turned on in a cold projector and when a higher stable temperature is reached after the projector has been operated for a period of time. This temperature increase is caused by the absorption of heat by the several components of the apparatus substantially enclosed within the apparatus casing. This general temperature increase requires that the massflow of air must be increased to prevent excessive heat buildup. Further, between projectors of the same design, variations in rotational speeds occur due to variations in the motor, and loads applied to the motor during certain modes of operation.

To overcome the short comings of the system previously described, an improved clutch mechanism is arranged between the fan or blower and the drive shaft of the motor used in an apparatus. Specifically, the fan is driven through the clutch mechanism at a substantially constant torque which automatically varies the speed of the blower with changing air density. The constant torque causes the blower to move a constant weight of air rather than a constant volume of air. Particularly, this torque limiting clutch is provided with a dual wound spring packed in a lubricant with the oppositely wound windings of the spring concentric. An inner winding is about the drive shaft and can frictionally engage the shaft or be released therefrom. The outer winding is connected at one end to the inner winding and is frictionally engageable with the interior of the hub of the fan. By this torque clutch, the fan rotates at a rate determined by weight of air. That is, as the air weight or resistance varies according to temperature, atmospheric pressure, and moisture content or relative humidity, the fan rotates at an "ideal" speed for moving air sufficient for cooling the apparatus but insufficient to create air flow noise. Specifically, the speed of the fan increases due to the clutch as either the moisture content increases or the temperature increases and the torque requirement is reduced so that a greater volume of air is moved to maintain the temperature within a desired range. Since decreasing temperature increases the weight of the air, a greater weight of air will be moved by the blower driven by a constantly rotating drive shaft, if without a clutch. However, due to the clutch, the fan slows slightly moving a little less volume of air but a constant air weight thereby modifying the air flow rate so as not to generate significant noise.

An object of the present invention is to provide an apparatus in which the undesired heat is removed by a clutched blower system to efficiently disperse the heat with a minimum of air flow noise.

Another object of the invention is to provide in an apparatus a blower system having a double wound spring clutch interposed between the blower and a drive shaft by which the blower is driven.

The above and other objects and advantages of the invention will become more apparent from the detailed description which follows when taken in conjunction with the accompanying drawings in which like numerals refer to like parts.

IN THE DRAWINGS

Figure 1:
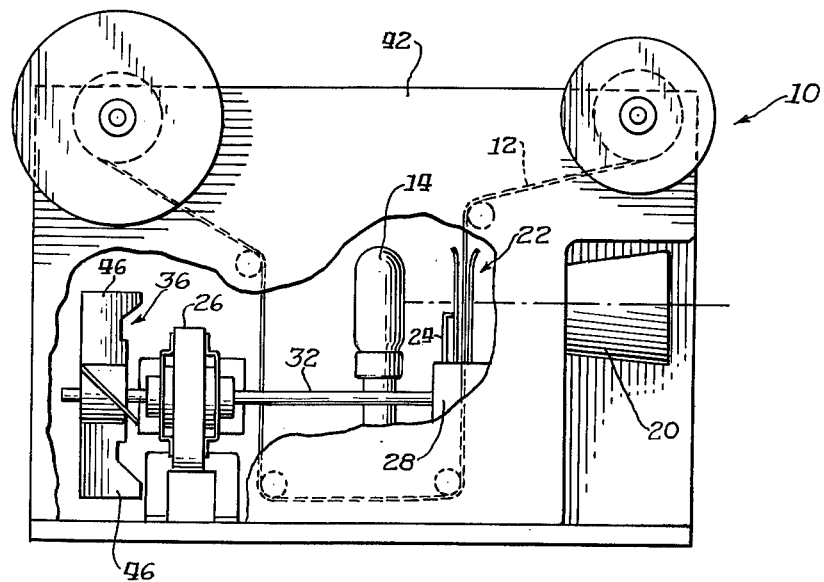
FIG. 1 is a schematic view of an apparatus such as a motion picture projector, showing primary components with which the blower assembly of this invention cooperate, with parts omitted and parts broken away for clarity.
Figure 2:
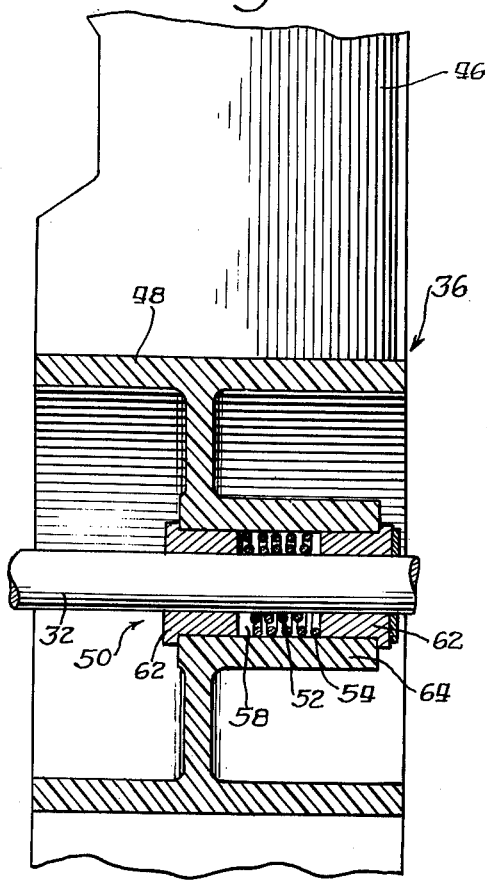
FIG. 2 is an enlarged sectional view through the blower assembly with parts broken away for clarity.

Referring to FIG. 1, an apparatus in which a blower system is used for cooling is shown schematically as an image projector 10. The projector, which may handle image supporting material 12 in the form of either motion picture film, strip film, or slides has a projection lamp 14 which generates, in addition to light for illuminating the image for viewing, a significant quantity of heat some of which must be dispersed. A projection lens 20 is provided for projecting the image of film transported through a projection station 22 onto a viewing surface (not shown). To transport the film 12 through the projection station, a film transport mechanism 24 is energized by a motor 26. A transmission 28 couples the motor, which operates at a substantially constant rate, to the film transport mechanism which may be a shuttle mechanism in a motion picture projector or a slide carrier in a slide projector. In addition to the transmission coupled to an output shaft 32 of the motor 26, a blower assembly 36 is mounted on the shaft to move air through the housing 42 of the projector so as to cool the film at the projection station, and otherwise disperse the heat which may accumulate in the housing.

Figure 3:
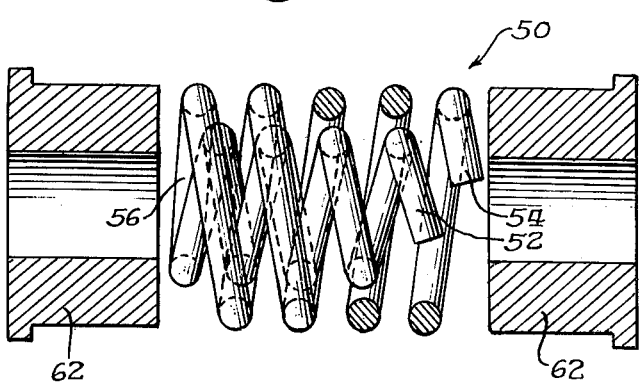
FIG. 3 is a further enlarged and exploded view of the dual wound clutch, broken away in part.

The fan or blower assembly 36 includes a plurality of impeller or blade members 46 attached to a hub portion 48. This assembly is mounted indirectly, to the motor shaft 32 through a clutch device 50, as partially detailed in FIG. 3. The clutch device forming a constant torque clutch is a dual wound spring defining an inner winding or loop portion 52 wound in a first direction and an oppositely wound outer winding or loop portion 54. Both loops are concentrically wound and are enclosed in a fluid tight chamber 58 in which a fluid of a selected viscosity and lubricity is retained about the motor shaft by end caps 62 and a sleeve portion 64 connected to the hub of the fan. The inner loop is wound in the direction of shaft rotation so that the loop unwinds slightly to release tension on the shaft 32 at all fan speeds. This tension expands the outer winding to tighten that winding in the hub of the blower. Thus the spring will deliver a uniform torque to the blower. When the fan slows due to encountering heavier air the tension of the inner winding on the shaft decreases. However, as the air density or weight decreases, the tension of the inner winding on the shaft is increased since less torque is required to move a comparable weight of air. Hence, the fan speed increases slightly.

The outer loop 54 is wound opposite to the direction of shaft rotation to couple the fan 40 to the inner loop 52. One end of the clutch spring inner loop is a connection 56 to the outer loop. Responsive to the resistance due to weight of the air, the clutch unwinds to cause this outer loop to frictionally engage the interior of the fan hub to positively drive the spring.

The spring loops 52, 54 are each wound with a tension force selected in a range to cause the spring clutch to function so as to rotate the fan with enough speed to circulate air but without such speed that air movement noise is generated. That is, the clutch is selected with adequate torque to drive the blades of the fan at a predetermined force against the weight of resistance of the air. The weight changes according to the altitude, the temperature, and the relative humidity of the ambient air. As the air weight decreases from a first value due to higher temperatures and higher relative humidity, speed of a directly driven fan would continue at the same rate moving the same volume of air at slightly less cooling efficiency. As the air weight increases due to lower temperatures and/or lower relative humidity, the same fan speed would cause a slight increase in the noise level. This requires more power to drive the fan and thereby reduces air movement efficiency.

In this preferred embodiment of a cooling system, it is desirable with an increase in temperature to increase the volume of air so as to improve the cooling efficiency, while not having the blower rotate at an excessive speed resulting in air noise. The drive of the constant speed drive shaft is transmitted to the blower through the constant torque clutch. In heavy air, the blower runs significantly slower than the speed of the shaft, tending to slip on the shaft at a high rate. As the air weight lessens, the fan speed increases to compensate for the reduction in the flow of air, and approaches but cannot equal shaft speed. The spring clutch transmits a uniform torque which output is a function of the spring tension rather than the coefficient of friction. In that the blower is driven at a constant torque, as the weight of the air changes, the speed of the fan changes at a rate to cause the same weight of the air to be moved. The torque would be modified as required to drive the blower at a rate corresponding to the new weight of the air. This would result since the torque is altered at a ratio corresponding to the square of the speed of the blower. Nevertheless, since the torque is maintained constant, the speed variation is only to the extent required to maintain the torque, and to move a constant weight of air for the particular temperature, humidity and air pressure conditions.

Air movement noise is generated in part by air turbulence as the fan blades move through the air. Beneath a critical speed range, the blades move through the air without pushing or pulling the air to a significant extent. Above that speed range, the blades move through the air with such speed that the air is disturbed to the extent that swirls are generated. These air swirls cause turbulence and inefficiency in air flow as well as generating air flow noise over the blades. In the middle of the speed range, the blades move air with efficiency so that as large as possible a quantity of air for the fan size is displaced with minimum noise being generated.

What is claimed is:

1. A low noise blower assembly for use in an image projector having a motor provided with a drive shaft, the assembly comprising:

blower means having a hub portion dimensioned larger than the motor drive output and being coupled to said drive shaft and spring clutch means interposed in a viscous environment between said drive shaft and said hub portion, said spring clutch means comprising two oppositely wound connected windings arranged substantially concentrically and parallel with one another, and tensioned to provide a substantially constant torque output to said hub portion which is less than said blower means would experience if said hub portion were directly coupled to said drive shaft; a first inner winding of said spring clutch means being coupled to said drive shaft, said second winding engaging said hub portion of said blower means for drive transfer to said hub portion; said drive shaft turning in a direction which causes said first winding to tend to unwind itself from said shaft.

2. Apparatus as in claim 1 wherein said dual spring clutch means transmits to said blower means from said drive shaft a constant torque to rotate said blower means at a rate equal to or less than the rate of rotation of said drive shaft.

3. Apparatus as in claim 1 wherein said dual spring clutch means is enclosed between said blower means hub portion and said drive shaft by end bearings which encase viscous fluid.

4. A low noise blower assembly for an apparatus having a motor provided with a drive shaft, the assembly comprising:
   blower means having a hub portion dimensioned larger than the motor drive shaft;
   dual wound spring clutch means interposed in a viscous environment between said drive shaft and said hub portion for driving said blower means at a constant torgue which is less than said blower means would experience if said hub portion were directly coupled to said drive shaft, said dual wound spring clutch means comprising two connected windings arranged substantially concentrically parallel with one another, and said windings being enclosed between said blower hub portion and said drive output within a viscous fluid;
   one winding of said clutch means gripping said drive shaft; and
   the other winding of said clutch means engaging said hub portion of said blower means; said drive shaft turning in a direction which causes said first winding to tend to unwind from the shaft;
   whereby said blower means is caused to rotate at a rate insufficient to cause air turbulence noise and sufficient for efficient air movement.

* * * * *

UNITED STATES PATENT OFFICE
CERTIFICATE OF CORRECTION

PATENT NO. : 4,090,785
DATED : May 23, 1978
INVENTOR(S) : Frank L. Weninger

It is certified that error appears in the above-identified patent and that said Letters Patent are hereby corrected as shown below:

Column 4, lines 49 and 50 (Claim 1, lines 5 and 6), delete "output and being coupled to said drive shaft and" and insert --shaft; and--.

Signed and Sealed this

Twelfth Day of June 1979

[SEAL]

Attest:

RUTH C. MASON
Attesting Officer

DONALD W. BANNER
Commissioner of Patents and Trademarks